(12) United States Patent
McCarty (10) Patent No.: US 9,316,321 B2
(45) Date of Patent: Apr. 19, 2016

(54) MULTI-PIECE FLOW CONTROL APPARATUS FOR USE WITH FLUID VALVES

(75) Inventor: Michael Wildie McCarty, Marshalltown, IA (US)

(73) Assignee: FISHER CONTROLS INTERNATIONAL, LLC, Marshalltown, IA (US)

( * ) Notice: Subject to any disclaimer, the term of this patent is extended or adjusted under 35 U.S.C. 154(b) by 667 days.

(21) Appl. No.: 13/103,736

(22) Filed: May 9, 2011

(65) Prior Publication Data

US 2012/0286183 A1 Nov. 15, 2012

(51) Int. Cl.
*F16K 1/48* (2006.01)
*F16K 1/36* (2006.01)

(52) U.S. Cl.
CPC .... *F16K 1/36* (2013.01); *F16K 1/48* (2013.01)

(58) Field of Classification Search
CPC .............. F16K 1/36; F16K 1/48; F16K 1/482; F16K 1/485; F16K 1/487; F16K 1/34; F16K 1/385; F16K 1/2014
USPC .................. 251/318, 366–368, 324, 356–357, 251/84–88, 308, 319
See application file for complete search history.

(56) References Cited

U.S. PATENT DOCUMENTS

| 47,309 | A | * | 4/1865 | Jenkins | 251/88 |
|---|---|---|---|---|---|
| 372,641 | A | * | 11/1887 | Robertshaw | 251/86 |
| 485,984 | A | * | 11/1892 | Randall | 251/88 |
| 1,763,486 | A | * | 6/1930 | Strong | 251/360 |
| 1,793,825 | A | * | 2/1931 | Pope | 251/357 |
| 2,448,429 | A | * | 8/1948 | Henry | 137/68.28 |
| 3,206,165 | A | * | 9/1965 | Salmon et al. | 251/335.3 |
| 3,260,497 | A | * | 7/1966 | Blackford | 251/184 |
| 3,380,705 | A | * | 4/1968 | Enssle | 251/89 |
| 3,572,633 | A | * | 3/1971 | Gaffney | 251/356 |
| 4,493,336 | A | | 1/1985 | Renfro | |
| 7,721,753 | B2 | * | 5/2010 | Wears | 137/315.27 |
| 8,297,593 | B2 | * | 10/2012 | Muzzo et al. | 251/332 |
| 2007/0040136 | A1 | * | 2/2007 | Caprera | 251/122 |

(Continued)

FOREIGN PATENT DOCUMENTS

| DE | 515889 | * | 1/1931 |
|---|---|---|---|
| EP | 1757850 | | 2/2007 |
| JP | 11051203 | | 2/1999 |

(Continued)

OTHER PUBLICATIONS

International Searching Authority, "International Search Report," issued in connection with international application serial No. PCT/US2012/036331, mailed Jul. 18, 2012, 3 pages.

(Continued)

*Primary Examiner* — Marina Tietjen
(74) *Attorney, Agent, or Firm* — Hanley, Flight & Zimmerman, LLC (57) ABSTRACT

Multi-piece flow control apparatus for use with fluid valves are described. An example flow control apparatus described herein includes a sleeve having first and second ends, the first end including a lip. A valve plug tip is disposed in the sleeve and has a shoulder engaged with an inner surface of the lip. An insert is disposed in the second end of the sleeve and engaged with the valve plug tip to urge the shoulder of the valve plug tip against the inner surface of the lip. The insert has an opening to receive a stem of the valve.

17 Claims, 6 Drawing Sheets

(56) References Cited

U.S. PATENT DOCUMENTS

2009/0049671 A1* 2/2009 O'Hara ................ 29/213.1
2009/0302258 A1* 12/2009 Haines et al. ............ 251/309

FOREIGN PATENT DOCUMENTS

| WO | 2007150000 | 12/2007 |
|----|------------|---------|
| WO | 2009026067 | 2/2009  |

OTHER PUBLICATIONS

International Searching Authority, "Written Opinion of the International Searching Authority," issued in connection with international application serial No. PCT/US2012/036331, mailed Jul. 18, 2012, 5 pages.

Emerson Process Management, "GX Control Valve and Actuator System," Instruction Manual, published Apr. 2011, 64 pages.
Emerson Process Management, "D4 Control Valve Assembly," Product Bulletin, published Oct. 2006, 12 pages.
Emerson Process Management, "D4 Control Valve Assembly," Instruction Manual, published Aug. 2009, 20 pages.
Emerson Process Management, "D and DA Valves," Instruction Manual, published Jun. 2008, 12 pages.
Emerson Process Management, "Design D and DA Control Valves," published Mar. 2008, 12 pages.
DYNA-FLO, "DF2000 Control Valve," Technical Sales Bulletin, published Apr. 2011, 16 pages.
International Searching Authority, "International Preliminary Report on Patentability," issued in connection with international application serial No. PCT/US2012/036331, mailed Nov. 12, 2013, 6 pages.
DYNA-FLO, "Model DF100 Control Valve," Technical Sales Bulletin, published Aug. 2011, 8 pages.

* cited by examiner

MULTI-PIECE FLOW CONTROL APPARATUS FOR USE WITH FLUID VALVES

FIELD OF THE DISCLOSURE

This disclosure relates generally to control valves and, more particularly, to multi-piece flow control apparatus for use with fluid valves.

BACKGROUND

Fluid valves are often used in process control plants or systems to control the flow of process fluids. In general, fluid valves typically include a valve trim assembly or apparatus that includes a valve plug (e.g., a metal valve plug) and a valve seat (e.g., a metal seat ring) that are disposed in a fluid path to control the flow of fluid through a passageway between an inlet and an outlet. A valve stem or shaft operatively couples the valve plug to an actuator such as, for example, a pneumatic actuator, a manual actuator, etc. The actuator moves the valve plug between an open position at which the valve plug is spaced from the valve seat to allow fluid flow through the passageway and a closed position at which the valve plug sealingly engages the valve seat to restrict or prevent fluid flow through the passageway.

In severe service applications such as, for example, in the petrochemical industry, control valves may be subjected to severely erosive fluid conditions that can rapidly wear or reduce the operating life of the valve trim (e.g., a valve plug, etc.). For example, the valve trim may be exposed to flowing process fluids that contain entrained particulate (e.g., ceramic catalyst fines). Valve plugs having tungsten carbide tips are often employed in severe service applications to reduce damage and/or wear caused by severely erosive process fluids that may otherwise damage metallic valve plugs, thereby increasing the operating life of the valve plug.

SUMMARY

In one example, a multi-piece flow control apparatus includes a sleeve having first and second ends, the first end including a lip. A valve plug tip is disposed in the sleeve and has a shoulder engaged with an inner surface of the lip. An insert is disposed in the second end of the sleeve and engaged with the valve plug tip to urge the shoulder of the valve plug tip against the inner surface of the lip. The insert has an opening to receive a stem of the valve.

In another example, a flow control apparatus includes a cylindrical housing and a valve plug tip disposed in the cylindrical housing. An insert is disposed in the cylindrical housing to capture the valve plug tip between an inner surface of the cylindrical housing and the insert.

DETAILED DESCRIPTION

In general, the example flow control apparatus described herein may be used with severely erosive and/or relatively high viscosity process fluids such as, for example, process fluids (e.g., gritty fluids, gases, etc.) having entrained particulate (e.g., ceramic catalyst, sand, debris, etc.) and the like that can cause damage or erosion to conventional valve plug apparatus. In particular, an example flow control apparatus described herein has a significantly greater operating life compared to conventional valve plugs. More specifically, the example flow control apparatus described herein have a significantly stronger connection between, for example, a flow control body and a valve plug tip (e.g., a tungsten carbide tip). Additionally, the example flow control apparatus described herein facilitate manufacturing or assembly of a multi-piece flow control apparatus composed of different materials.

One example flow control apparatus described herein includes a multi-piece flow control member having a first portion or valve plug tip removably coupled to an insert or base via a retainer, sleeve or fastener. The retainer or sleeve traps, captures, secures or otherwise retains the valve plug tip relative to the insert. The valve plug tip may be composed of a first material and the insert may be composed of a second material different than the first material. The retainer or sleeve provides a relatively stronger connection or joint between the valve plug tip and the insert compared to, for example, conventional valve plugs that use sintering, brazing or other similar manufacturing techniques or processes to provide a connection between a conventional valve plug tip and a conventional insert or valve plug body. Thus, the example flow control apparatus described herein eliminates brazing or sintering processes and provides a drop-in insert that is trapped or captured between an insert or valve plug body and a retainer or sleeve.

The valve plug tip of the example flow control apparatus described herein may be composed of a material for use in severely erosive fluids such as, for example, relatively high viscosity fluids and/or fluids containing particulate (e.g., ceramic catalyst fines). Further, the sleeve or retainer provides a joint or connection that significantly reduces or prevents the connection between the valve plug tip and the insert from fracturing, cracking or otherwise becoming damaged during operation, assembly, manufacturing, shipping, etc. More specifically, the connection captures the valve plug tip and the insert such that the retainer or sleeve provides a compressive force to the valve plug tip and the insert while significantly reducing or providing negligible tensile stresses at the connection between the valve plug tip and the insert. Additionally, an example flow control apparatus described herein may be factory installed or may be retrofit to existing valves in the field.

Figure 1:
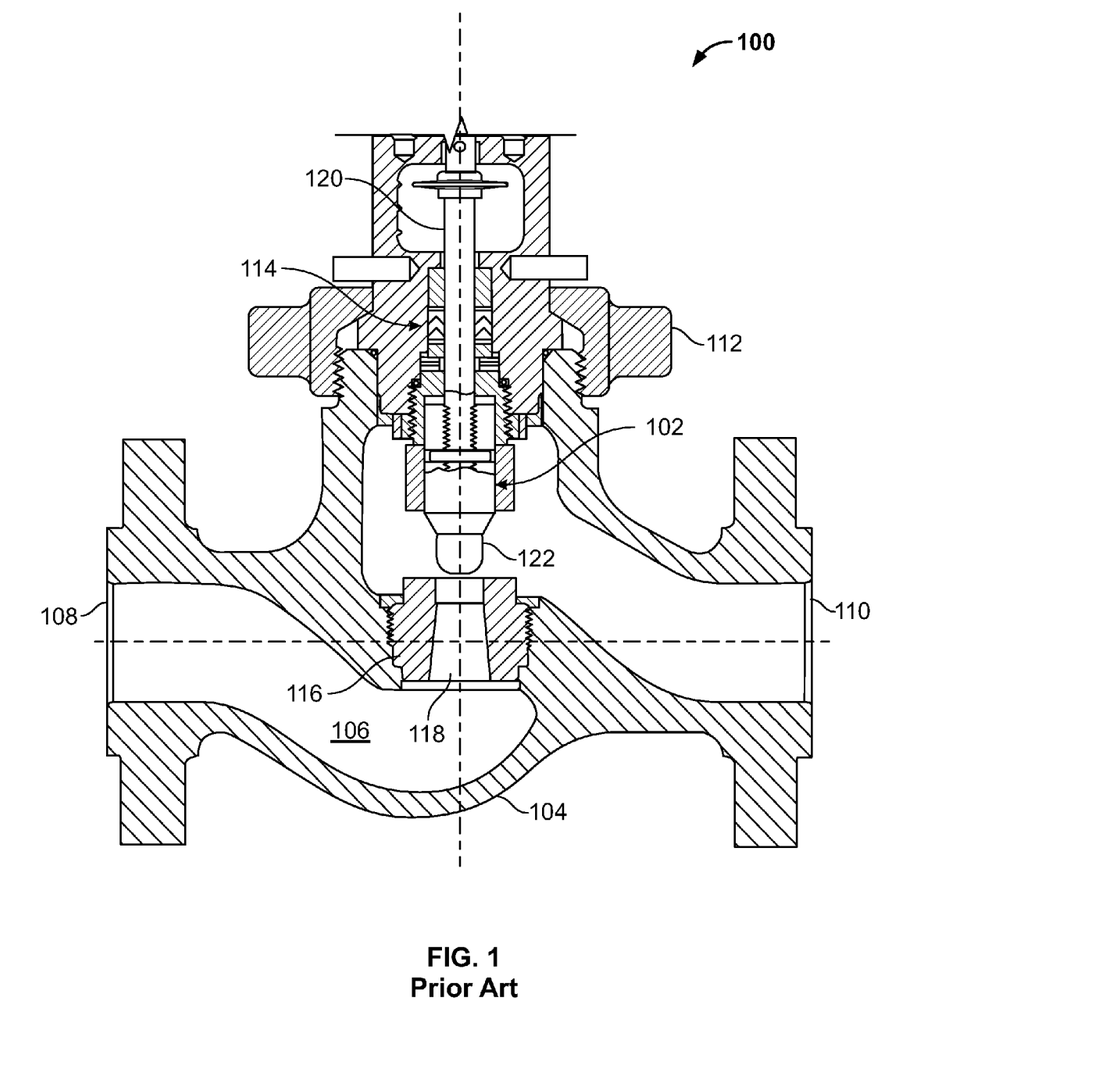
FIG. 1 illustrates a known fluid valve implemented with a known valve plug apparatus.

FIG. 1 illustrates a known fluid valve 100 having a known valve plug apparatus 102 that may be used in severe service applications (e.g., severely erosive process fluid, high pressure applications, etc.). Referring to FIG. 1, the example fluid valve 100 includes a valve body 104 that defines a fluid flow passageway 106 between an inlet 108 and an outlet 110. A bonnet 112 is coupled (e.g., threadably coupled) to the valve body 104 and couples the valve body 104 to an actuator (not shown). The bonnet 112 also houses a packing system 114 to prevent leakage of process fluid to the environment.

A valve seat or seat ring 116 is disposed within the passageway 106 to define an orifice 118. The valve plug apparatus 102 is disposed within the fluid flow passageway 106 and is operatively coupled to an actuator via a valve stem 120.

In operation, an actuator (e.g., a pneumatic actuator, an electric actuator, a hydraulic actuator, a manual actuator, etc.) moves the valve plug apparatus 102 via the valve stem 120 relative to the seat ring 116 to control fluid flow through the passageway 106 between the inlet 108 and the outlet 110. In particular, the valve plug apparatus 102 moves between a closed position at which the valve plug apparatus 102 is sealingly engaged with the seat ring 116 to prevent or restrict fluid flow through the passageway 106 between the inlet 108 and the outlet 110 and a fully open or maximum flow position at which the valve plug apparatus 102 is spaced away from the seat ring 116 to allow fluid flow through the passageway 106 between the inlet 108 and the outlet 110.

In severe service applications (e.g., petrochemical applications), the valve plug apparatus 102 may be exposed to severely erosive and/or corrosive fluid conditions or the like that can rapidly wear or cause material loss and significantly reduce the operating life of the valve plug apparatus 102. For example, the valve plug apparatus 102 may be exposed to process fluids entrained with particulate (e.g., ceramic catalyst fines) or relatively high viscosity fluids, which can wear or degrade a surface or tip 122 of the valve plug apparatus 102. Thus, in severely erosive fluid conditions, valve plugs having inserts made of tungsten carbide materials, ceramic materials, etc. are often employed because such materials have relatively high resistance to erosive or corrosive fluid conditions, thereby increasing the operating life of the valve plug apparatus 102.

Figure 2:
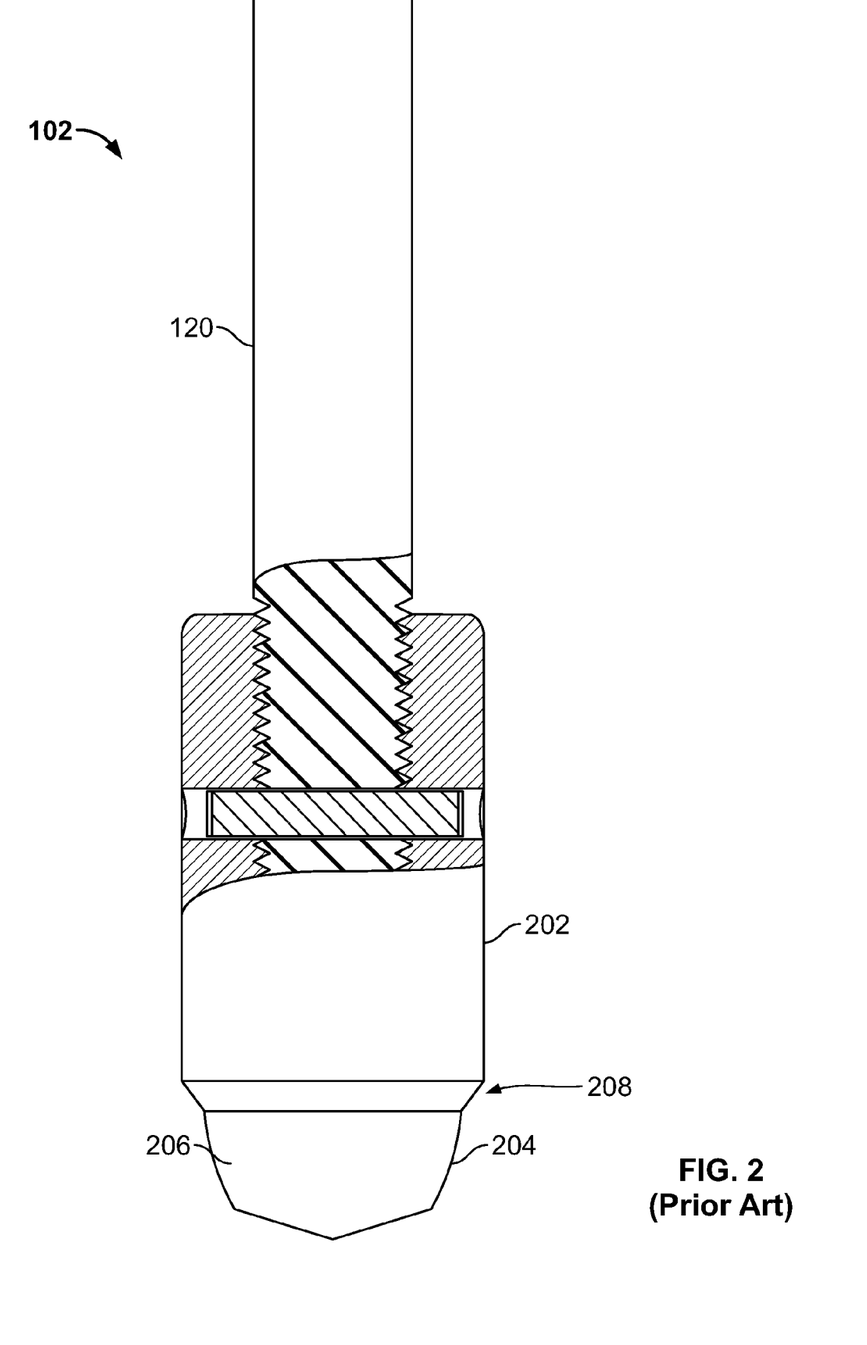
FIG. 2 is an enlarged view of the known valve plug apparatus of FIG. 1.

FIG. 2 illustrates the known valve plug apparatus 102 of FIG. 1. Referring to the example of FIG. 2, the valve plug apparatus 102 includes a valve plug body or insert 202 having a tungsten carbide tip 204 to protect an end or surface 206 of the valve plug body 202 that is in direct fluid contact with the fluid from adverse process effects such as, for example, abrasion, erosion, corrosion, etc.

The material properties of tungsten carbide are not suitable for welded or threaded joints. As a result, the tungsten carbide tip 204 is typically coupled to the valve plug body 202 via, for example, sintering or brazing manufacturing process(es). When sintered or brazed, the valve plug body 202 and the tungsten carbide tip 204 form a connection 208. However, using sintering or brazing manufacturing techniques often causes the connection 208 to be brittle and/or provides a significant amount of tensile stresses at the connection 208. Such a brittle connection and/or the tensile stresses at the connection 208 may cause the tungsten carbide tip 204 to break, fracture, crack or otherwise become damaged and cause the tip 204 to disengage or detach from the valve plug body 202. The valve plug apparatus 102 exposed to particulate and/or highly viscous fluid in this manner becomes ineffective at controlling fluid flow through the fluid valve 100. As a result, sintering or brazing the valve plug body 202 and the tungsten carbide tip 204 results in a significantly reduced operating life of the valve plug apparatus 102. Further, the complexity of sintering and brazing manufacturing processes often leads to low quality, low yield products because the connection 208 is often weak or brittle and, thus, is susceptible to cracking, fracturing, etc. For example, the tungsten carbide tip 204 may break or detach at the connection 208 during, for example, a cooling process of the valve plug apparatus 102 when the tungsten carbide tip 204 is coupled to the valve plug body 202, during shipment of the product, during operation, etc.

Figure 3:
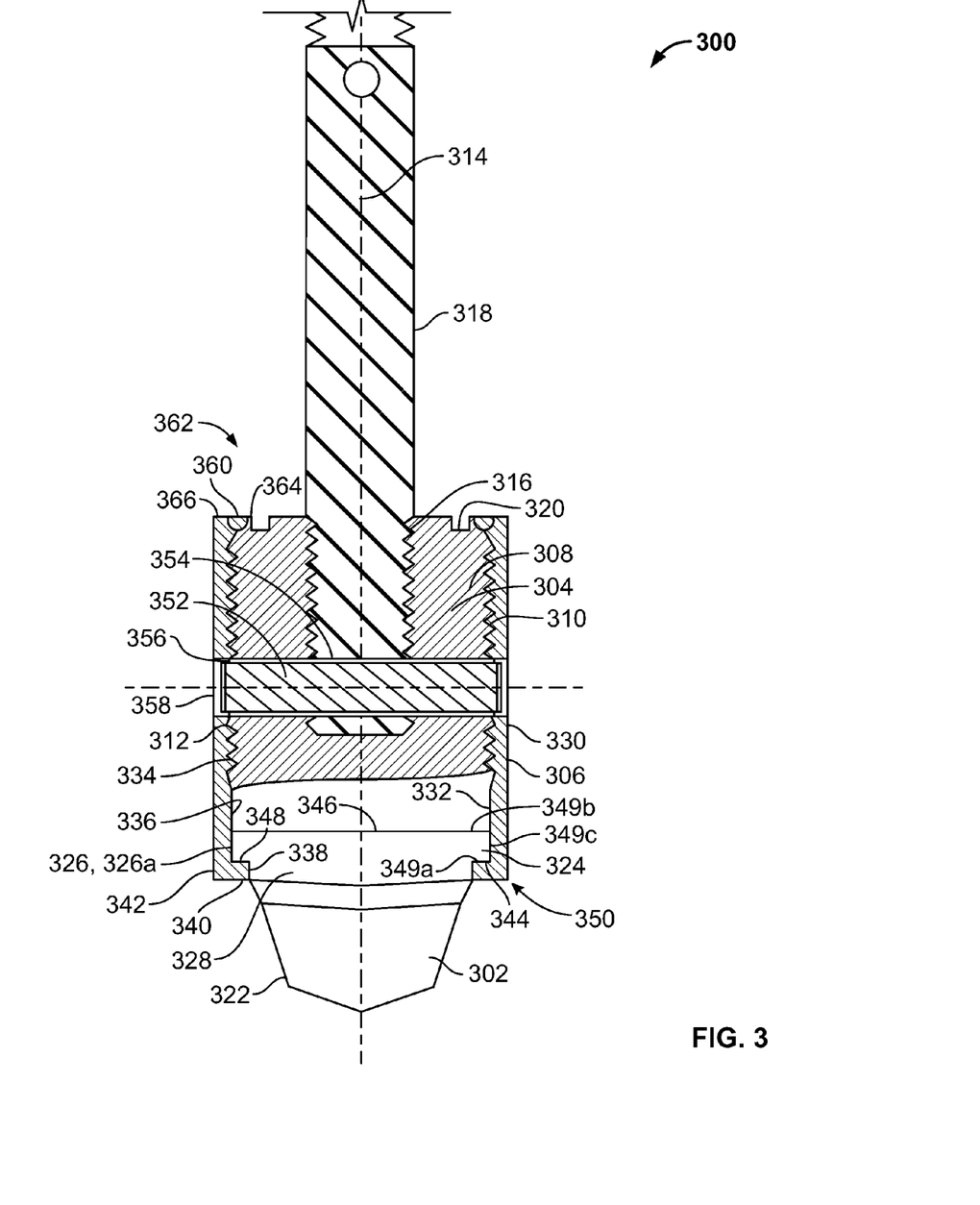
FIG. 3 illustrates a partial cross-sectional view of an example flow control apparatus described herein that may be used with a fluid valve.

FIG. 3 illustrates an example multi-piece valve plug or flow control apparatus 300 described herein that can be used with a fluid valve such as, for example, the fluid valve 100 of FIG. 1. In particular, the flow control apparatus 300 described herein may be employed in severely erosive or corrosive applications such as, for example, applications involving relatively highly viscous process fluids and/or process fluids entrained with particulate (e.g., ceramic catalyst fines) or other contaminates.

Referring to FIG. 3, the flow control apparatus 300 includes a valve plug tip 302 coupled to an insert or base 304 via a retainer or sleeve 306 (e.g., a multi-piece valve plug assembly). In this example, the insert 304 is composed of a first material (e.g., stainless steel) and the valve plug tip 302 is composed of a second material different than the first material (e.g., tungsten carbide).

The insert 304 of FIG. 3 includes a cylindrically-shaped body 308 having a threaded portion 310 along an outer surface 312 of the body 308 that extends in a direction along an axis 314 of the insert 304. The insert 304 of the illustrated example also includes an aperture 316 (e.g., a threaded opening) to receive a valve stem 318 that couples the flow control apparatus 300 to, for example, an actuator (not shown). In other examples, the insert 304 and the valve stem 318 may be a unitary piece or structure. In yet other examples, the valve stem 318 may be coupled to the insert 304 via a tack weld, a pin, a fastener or any other suitable fastening mechanism(s). As described below, the insert 304 of FIG. 3 may include one or more openings, recesses or features 320 adjacent the valve stem 318 and the outer surface 312 of the insert 304. In the illustrated example of FIG. 3, the insert 304 is composed of stainless steel. However, in other examples, the insert 304 may be composed of an alloy, a metal, or any other suitable material(s).

The valve plug tip 302 has a sealing surface 322 to engage a seating surface of a valve seat (e.g., the valve seat 116 of FIG. 1) when the flow control apparatus 300 is coupled to a fluid valve (e.g., the fluid valve 100 of FIG. 1). The valve plug tip 302 includes an engagement surface 324 adjacent the seating surface 322 that is depicted as a flange 326 (e.g., an annular flange) in the illustrated example of FIG. 3. In particular, the valve plug tip 302 of the illustrated example is a cylindrical body 328 having an annular flange 326a. The sealing surface 322 extends away from the body 328 and the annular flange 326a, and tapers toward the longitudinal axis 314 of the insert 304. In this example, the valve plug tip 302 is composed of a tungsten carbide material. However, in other examples, the valve plug tip 302 may be composed of a metallic material or alloy, a ceramic material and/or any other suitable material(s) having relatively high resistance to erosive or corrosive fluid conditions.

As noted above, the retainer 306 removably couples, traps, secures or retains the valve plug tip 302 and the insert 304. In this manner, the valve plug tip 302 may be interchanged or replaced with another valve plug tip that is substantially similar to the valve plug tip 302 of FIG. 3. Additionally or alternatively, the valve plug tip 302 of FIG. 3 may be replaced or interchanged with a valve plug tip that is different than the valve plug tip 302. For example, a valve plug tip coupled to the insert 304 may be composed of a ceramic material and can be replaced or interchanged with another valve plug tip composed of, for example, tungsten carbide material or any other material for use in highly erosive fluid conditions. Further, the valve plug tip 302 of FIG. 3 facilitates manufacturing and significantly reduces costs by eliminating brazing and sintering manufacturing process(es) and facilitating assembly of the flow control apparatus 300.

In the illustrated example of FIG. 3, the retainer 306 is a threaded fastener or nut. As shown in FIG. 3, the sleeve or retainer 306 has a retainer body 330 (e.g., a cylindrical body) that defines a cavity 332 sized to receive at least a portion of the insert 304. The retainer 306 includes a threaded portion 334 along a length of an inner surface or wall 336 of the cavity 332 of the retainer body 330 to engage the threads of the insert 304. The retainer 306 also includes an opening 338 coaxially aligned with the cavity 332 to receive the seating surface 322 of the valve plug tip 302. In other words, a diameter of the opening 338 is greater than a diameter of the seating surface 322 but less than an outer diameter of the flange 326.

Additionally, the retainer 306 includes a lip, shoulder or support surface 340 adjacent an end 342 of the retainer body 330. In this example, the lip 340 forms a shoulder 344 defined by a diameter of the cavity 332 being greater than a diameter of the opening 338. The lip 340 as depicted in FIG. 3 is an annular lip that is integrally formed with the retainer body 330 as a unitary piece or structure. In other examples, the lip 340 may be a plurality of protruding members radially spaced about the axis 314 and inwardly protruding from the retainer body 330 toward the axis 314.

During assembly, the valve plug tip 302 is at least partially disposed within the cavity 332 of the retainer 306 so the seating surface 322 of the valve plug tip 302 at least partially extends through the opening 338 of the retainer 306. The lip 340 of the retainer 306 supports or engages the engagement surface 324 of the valve plug tip 302 when the valve plug tip 302 is coupled to (e.g., disposed within the cavity 322) the retainer 306. The retainer 306 and the valve plug tip 302 are then coupled to the insert 304. For example, the retainer 306 and the valve plug tip 302 are coupled to the insert 304 after the insert 304 has been coupled to the valve shaft 318. In other examples, the retainer 306 and the valve plug tip 302 may be coupled to the insert 304 prior to the insert 304 being attached or coupled to the valve stem 318. In the illustrated example, the retainer 306 is fastened or threaded to the body 308 of the insert 304.

When the valve plug tip 302 is coupled to the insert 304 via the retainer 306, an inner surface 348 of the lip 340 (e.g., substantially perpendicular to the surface 336) engages a first side 349a of the engagement surface 324 of the valve plug tip 302 and a surface 346 of the insert 304 engages a second side 349b of the engagement surface 324 to retain or capture the engagement surface 324 between the insert 304 and the retainer 306. In particular, the lip 340 of the retainer 306 and/or the insert 304 apply a force (e.g., a compressive force) against the engagement surface 324 in a direction (e.g., a vertical direction) along the axis 314 when the retainer 306 is fastened to the insert 304 to prevent the valve plug tip 302 from moving relative to the insert 304 and/or the retainer 306.

Further, in the illustrated example, when coupled to the flow control member 300, the inner surface 336 of the retainer 306 engages a third side 349c of the engagement surface 324 of the valve plug tip 302 with a relatively tight fit or tolerance to prevent or significantly reduce movement or play of the valve plug tip 302 relative to the insert 304 and/or the retainer 306. Additionally, the surface 348 of the lip 340 (e.g., parallel to the surface 336) engages the body 328 of the valve plug tip 302. As a result, the retainer 306 applies a compressive force against the valve plug tip 302 in a direction substantially perpendicular to the axis 314. However, in other examples, the side 349c may be spaced away from the inner surface 336.

Thus, when coupled to the insert 304, the engagement surface 324 engages the lip 340, the inner surface 336 of the retainer 306, and the surface 346 of the insert 304 with a relatively tight fit to prevent movement of the valve plug tip 302 relative to the retainer 306 and/or the insert 304. As a result, in this example, the retainer 306 applies both a radial compressive force relative to the axis 314 and an axial compressive force relative to the axis 314 when the retainer 306 is coupled to the insert 304.

In other examples, the retainer 306 is coupled to the valve plug tip 302 via shrink fit, press fit and/or any other suitable manufacturing process(es). For example, the retainer 306 may be heated so that it expands, the valve plug tip 302 may be disposed within the cavity 332 of the retainer 306 so that at least a portion of the seating surface 322 extends through the opening 338, and the retainer 306 may be cooled. When the retainer 306 cools, the retainer 306 contracts to capture, surround or retain (e.g., the flange 326 of) the valve plug tip 302 with a relatively tight fit. In other examples, the valve plug tip 302 may be press-fit within the cavity of the retainer 306 so that the retainer 306 engages or retains the valve plug tip 302 with a relatively tight fit. When the retainer 306 is shrink fit or press fit with the valve plug tip 302, the retainer 306 captures the valve plug tip 302 to provide or apply a compressive force to the valve plug tip 302 in a direction substantially perpendicular to the axis 314. Thus, in this example, the retainer 306 provides a compressive force on an outer surface(s) (e.g., the surface 349c, the body 328) of the valve plug tip 302 in a radial direction toward the axis 314. Additionally or alternatively, the insert 304 may be press-fit and/or shrink fit with the retainer 306 and valve plug tip 302 assembly to couple or secure the insert 304 and the retainer 306.

Thus, unlike the connection 208 of FIG. 2, the retainer 306 and the insert 304 form a connection 350 that provides compressive stresses or forces. Further, the connection 350 provides negligible tensile stresses or forces between the valve plug tip 302 and the insert 304. As a result, the connection 350 is significantly stronger or more robust than, for example, the connection 208 of FIG. 2 and prevents or significantly reduces the likelihood of the valve plug tip 302 disengaging from the insert 304 during operation, manufacturing, shipping, etc. Additionally, during assembly, when the retainer 306 is coupled to the insert 304, a tool such as a spanner tool may be disposed within the openings 320 to rotatably fix the insert 304 relative to the retainer 306 when threading the retainer 306 onto the insert 304 to enable, for example, applying a desired torque to the retainer 306 when fastening the retainer 306 to the insert 304.

Additionally, a pin 352, or any other fastening method such as, for example, tack welding, may be used to prevent the valve stem 318 from rotating and backing out of and/or moving further into the insert 304. As shown in FIG. 3, the pin 352 is disposed within an opening or passageway 354 of the valve stem 318 that is coaxially aligned with respective openings or passageways 356 and 358 of the insert 304 and the retainer 306. In this example, the respective openings 356 and 358 of the insert 304 and the retainer 306 are coaxially aligned with the opening 354 of the valve stem 318 and substantially perpendicular to the axis 314. In other examples, the pin 352 is not required.

Further, a seal weld 360 may be disposed about a periphery of an insert/retainer interface 362 between respective surfaces 364 and 366 of the insert 304 and the retainer 306 to prevent the retainer 306 from rotating or unthreading relative to the insert 304 due to, for example, vibration(s) during operation. The seal weld 360 may be an annular weld or one or more spot welds radially disposed relative to the axis 314 about the periphery of the interface 362.

To remove the valve plug tip 302 from the insert 304, for example, in the field, the pin 352 is removed from the openings 354, 356, 358 and the seal weld 360 is removed from insert/retainer interface 362. The retainer 306 is threadably decoupled from the insert 304 by rotating the retainer 306 relative to the insert 304 about the axis 314. To facilitate rotation of the retainer 306 relative to the insert 304 when removing the retainer 306, a tool (e.g., a spanner tool) may be disposed within the openings 320 adjacent the insert/retainer interface 362. With the tool (e.g., the spanner tool) inserted in the openings 320, an operator may hold or prevent rotation of the insert 304 when the retainer 306 is being unthreaded or rotated relative to the insert 304. Removing the retainer 306 also removes the valve plug tip 302 from the insert 304. Once the retainer 306 is removed, the valve plug tip 302 may be removed or detached from the retainer 306.

In some examples, the valve plug tip 302 may be replaced or interchanged with another valve plug tip that is substantially similar to the valve plug tip 302 of FIG. 3 (e.g., a valve plug tip composed of tungsten carbide material). However, in other examples, the valve plug tip 302 may be replaced or interchanged with a valve plug tip that is substantially different than the valve plug tip 302 of FIG. 3 (e.g., a valve plug tip composed of ceramic material). In other examples, the valve plug tip 302 and retainer 306 assembly may be removed and replaced with another valve plug tip/retainer assembly.

During operation, the flow control apparatus 300 is disposed within a passageway of a valve body to control the fluid flow between an inlet and an outlet. An actuator may be operatively coupled to the flow control apparatus 300 via the valve stem 318. Particulate and/or viscous fluid flows through the passageway and impacts the valve plug tip 302. The valve plug tip 302, which may be composed of tungsten carbide material, resists erosion and corrosion as particulate suspended in process fluid flows across the seating surface 322 of the valve plug tip 302. Thus, the valve plug tip 302 resists highly erosive process conditions and the insert/retainer connection 350 prevents the valve plug tip 302 from disengaging, breaking or decoupling from the insert 304.

Figure 4:
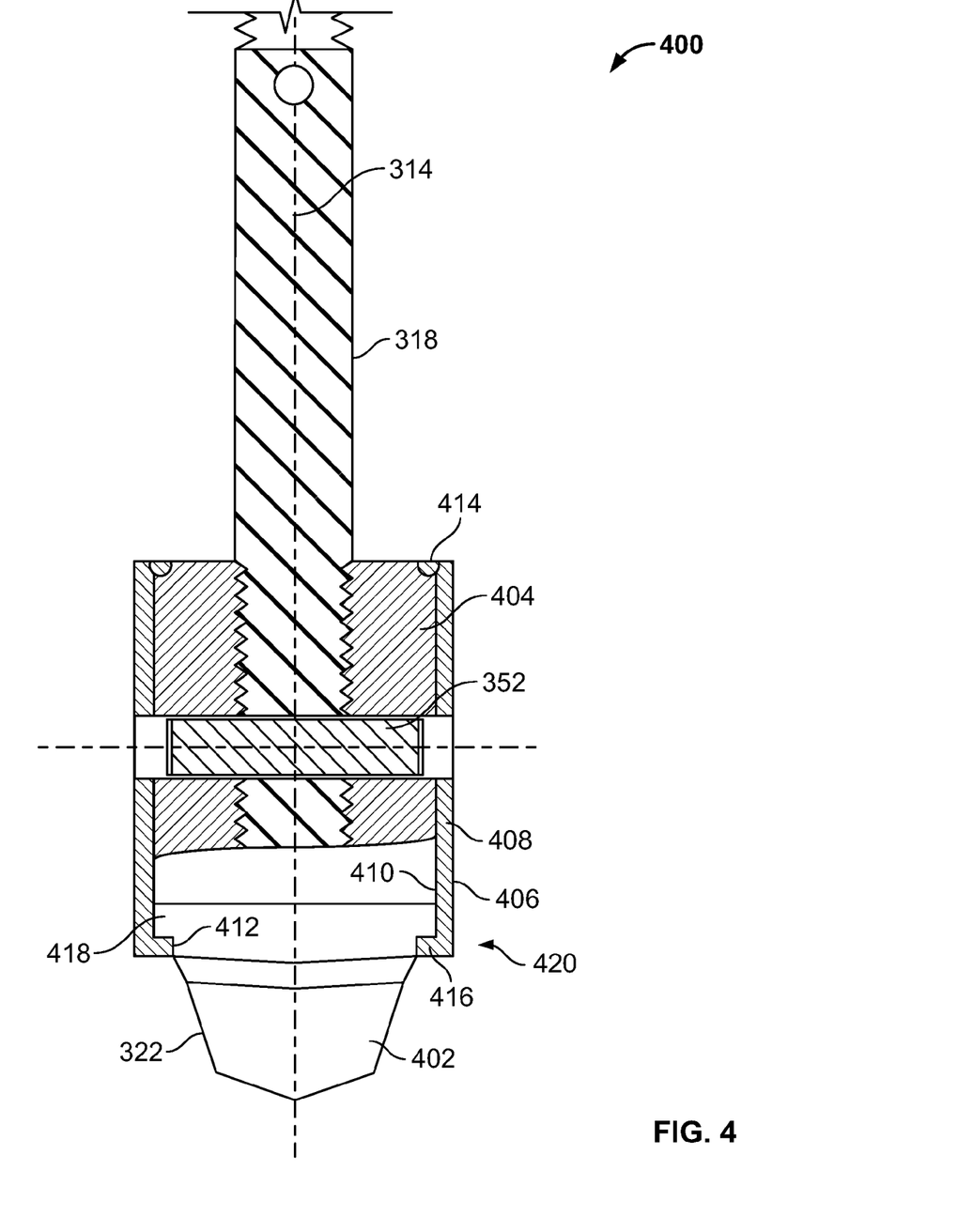
FIG. 4 illustrates a partial cross-sectional view of another example flow control apparatus described herein that may be used with fluid valve.

FIG. 4 illustrates another example valve plug or flow control apparatus 400 described herein that may be used with a fluid valve such as, for example, the fluid valve 100 of FIG. 1. Those components of the example flow control apparatus 400 that have structures or functions that are similar or identical to the structures or functions of those components of the example flow control apparatus 300 of FIG. 3 are labeled with the same reference numbers. The description of those components of the example flow control apparatus 400 similar or identical to those components of FIG. 3 is not repeated and the interested reader may refer to the description of FIG. 3 for details relating to those components.

The flow control apparatus 400 of FIG. 4 includes a valve plug tip 402 removably coupled to an insert 404 via a retainer or sleeve 406. In particular, the retainer 406 is a shroud or body 408 (e.g., a cylindrical body) having a cavity 410 to receive at least a portion of the insert 404 and an opening 412 to receive the valve plug tip 402. Unlike the retainer 306 of FIG. 3, a seal weld 414 (e.g., an annular seal weld) couples or attaches the retainer 406 and the insert 404. In other words, the retainer 406 of FIG. 4 is a non-threaded cylindrical body that is coupled to the insert 404 via, for example, welding. The retainer 406 includes a lip 416 (e.g., an annular lip) that engages an engagement surface or flange 418 of the valve plug tip 402 to retain the valve plug tip 402 in engagement with the insert 404. The retainer 406 is sized to provide a tight tolerance fit when coupled to the insert 404 so that the retainer 406 and/or the insert 404 provide a compressive force to the valve plug tip 402 when the retainer 406 is coupled to the insert 404 via the weld 414. Thus, similar to the retainer 306 of FIG. 3, the retainer 406 captures the engagement surface 418 between the lip 416 and the insert 404 with a tight fit to apply a compressive force to the engagement surface 420 in a direction along the axis 414 to retain the valve plug tip 402 coupled to the insert 404. As a result, the retainer 406 and the valve plug tip 402 form a connection 420 that lacks tensile stresses, thereby providing a connection that is substantially stronger than, for example, the connection joint 208 of FIG. 2.

Although the example flow control apparatus of FIGS. 3 and 4 are depicted as flow control apparatus 300, 400 for use with sliding stem valves, the example flow control apparatus described herein are not limited to use with sliding stem fluid valves. In other examples, fluid valves such as, for example, globe valves, rotary valves, linear valves, etc., may be employed.

Figure 5:
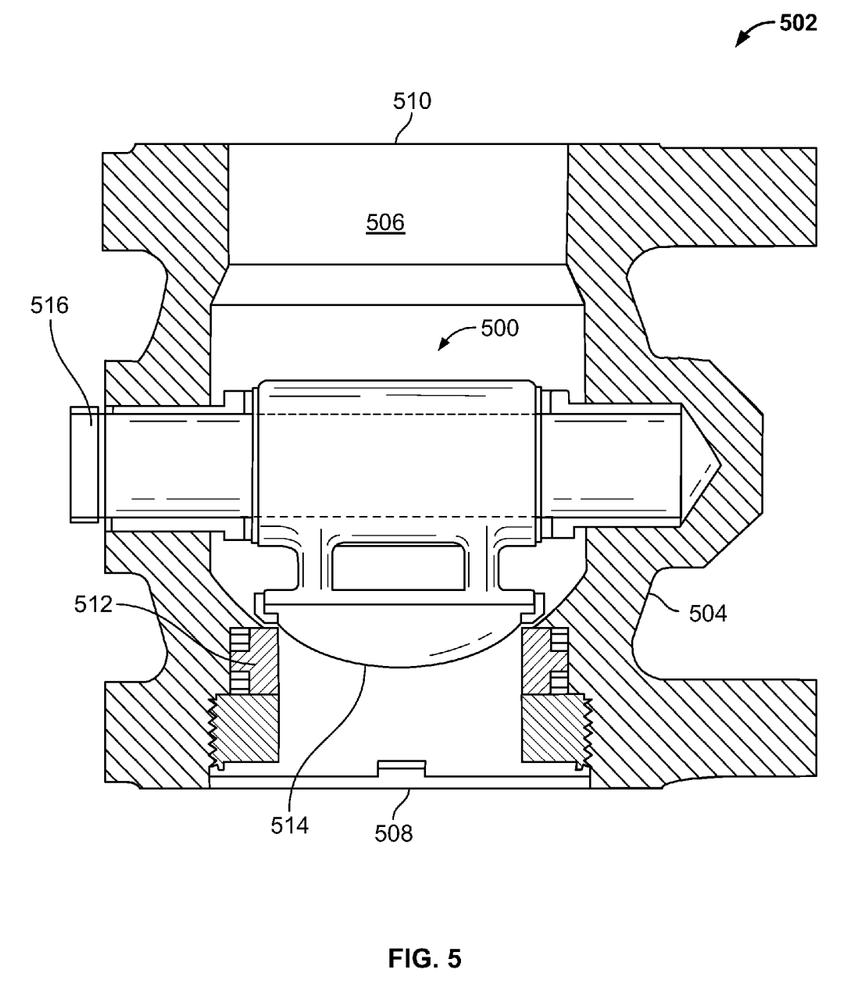
FIG. 5 illustrates another example flow control apparatus described herein that may be used with a rotary fluid valve.

FIG. 5 illustrates another example fluid flow control apparatus or assembly 500 for use with a rotary fluid valve 502. The rotary fluid valve 502 includes a body 504 defining a fluid flow passageway 506 between an inlet 508 and an outlet 510. The flow control apparatus 500 is disposed within the fluid flow passageway 506 and rotates or moves relative to a seat ring or valve seat 512 to control or modulate fluid flow between the inlet 508 and the outlet 510. In particular, a seating surface 514 of the flow control apparatus 500 engages the seat ring 512 to restrict or prevent fluid flow through the passageway 506 (e.g., a closed position) and rotates or moves away from the seat ring 512 to allow fluid flow through the passageway 506 (e.g., an open position). A valve shaft 516 operatively couples the flow control apparatus 500 to an actuator (not shown), which rotates or moves the flow control apparatus 500 relative to the seat ring 512.

Figure 6:
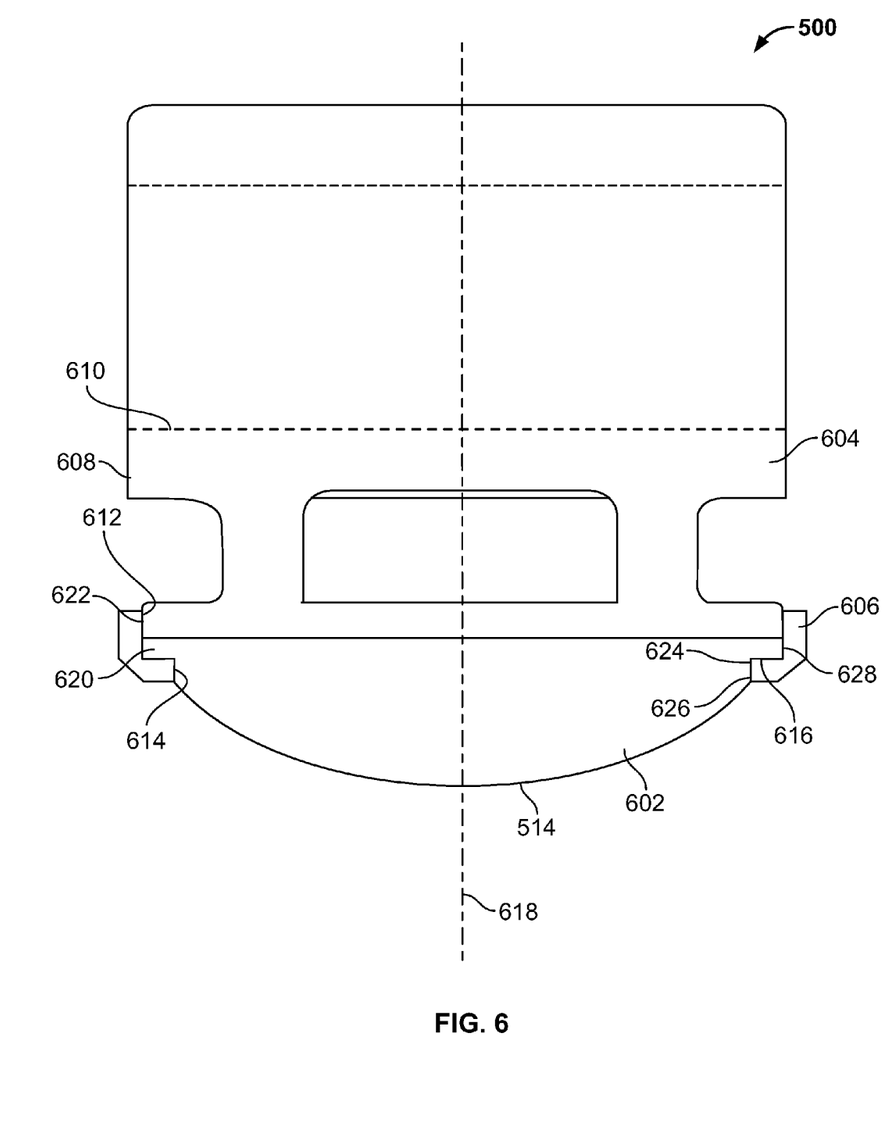
FIG. 6 is an enlarged view of the example flow control apparatus of FIG. 5.

FIG. 6 illustrates the example flow control apparatus 500 of FIG. 5. The flow control apparatus 500 of FIG. 6 includes a valve plug tip 602 coupled to an insert or valve plug body 604 via a retainer or sleeve 606. The insert 604 and the retainer 606 may be composed of, for example, stainless steel, metal, etc. and the valve plug tip 602 may be composed of, for example, tungsten carbide, ceramic, etc.

The insert 604 includes a body or portion 608 (e.g., a cylindrical body) having an opening 610 to receive the shaft 516 and is coupled or fixed (e.g., axially and rotatably fixed) to the shaft 516 via a pin, a fastener or any other suitable mechanical fastener(s). The retainer 606 is a ring-shaped shroud or fastener having a cavity defining an inner surface or wall 612. The retainer 606 also includes an opening 614 adjacent an end of the retainer 606 and coaxially aligned with the cavity to define a lip or shoulder 616. In particular, the lip 616 protrudes from the inner surface 612 of the retainer 606 (e.g., perpendicularly or at an angle) toward a longitudinal or central axis 618 of the retainer 606.

The valve plug tip 602 defines the seating surface 514 (e.g., a curved surface) and has an engagement surface or flange 620 adjacent the seating surface 514. When coupled to the retainer 606, the valve plug tip 602 is disposed within the cavity of the retainer 606 such that the seating surface 514 extends or protrudes from the opening 614 and away from the lip 616, and the lip 616 engages or supports the flange 620 of the valve plug tip 602. As shown, the sealing surface 514 of the valve plug tip 602 is sized to fit through the opening 614 with a relatively tight fit or tolerance. In some examples, the valve plug tip 602 is shrink fit, press fit, or coupled to the retainer 606 via any suitable manufacturing process(es).

In the illustrated example, a surface 624 of the opening 614 engages a surface or portion 626 of the valve plug tip 602 adjacent the flange 620 and the inner surface 612 of the retainer 606 engages a surface 628 of the flange 620 with a relatively tight fit. As a result, the retainer 606 applies a compressive force (e.g., a radial compressive force) to the valve plug tip 602 in a direction (e.g., a perpendicular direction) toward the axis 618 when the valve plug tip 602 is coupled to the retainer 606. Further, when the retainer 606 couples the valve plug tip 602 to the insert 604, the flange 620 of the valve plug tip 602 is captured between the insert 604 and the retainer 606 with a relatively tight fit or tolerance so that the retainer 606 and/or the insert 604 apply a compressive force (e.g., an axial compressive force) to the valve plug tip 602 in a direction substantially parallel to the axis 618.

The retainer 606 may be coupled to the insert 604 via threads, welding, or any other suitable manufacturing process(es) such as, for example, the examples described above in connection with FIGS. 3 and 4. For example, the inner surface 612 of the retainer 606 and an outer surface 622 of the insert 604 may include threads to removably couple the retainer 606 and the valve plug tip 602 to the insert 604.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. A flow control member, comprising:
    a sleeve of a rotary valve having first and second ends, the first end including a lip, the lip defining an inner surface;
    an insert disposed in the second end of the sleeve and defining an axis along the length of the insert, the insert and the sleeve defining a first threaded interface therebetween;
    a valve stem, the valve stem and the insert defining a second threaded interface therebetween; and
    a valve plug tip disposed in the sleeve and having a flange defining a shoulder, the shoulder and the inner surface perpendicular to the axis, wherein the insert has a first contact surface to engage a second contact surface of the valve plug tip to urge the shoulder of the valve plug tip against the inner surface of the lip.

2. The flow control member of claim 1, wherein the valve plug tip comprises a tungsten or ceramic material.

3. The flow control member of claim 1, wherein the insert is fixed relative to the sleeve by a weld adjacent the second end of the sleeve.

4. The flow control member of claim 1, wherein the insert includes an aperture to receive a tool to urge the insert against the valve plug tip within the sleeve.

5. The flow control member of claim 1, further comprising an aperture passing through the sleeve and the insert, the aperture to receive a pin preventing one or more of the sleeve, or the insert from rotating relative to the valve stem.

6. The flow control member of claim 5, wherein the aperture is substantially perpendicular to an opening of the insert.

7. A flow control apparatus comprising:
    a cylindrical housing having first and second ends, the first end having a lip defining an inner surface;
    a valve plug tip disposed in the cylindrical housing and having a flange defining a shoulder; and
    an insert disposed in the cylindrical housing defining an axis along a length of the insert, the shoulder and the lip perpendicular to the axis, the insert to capture the valve plug tip between an inner surface of the cylindrical housing and the insert a first surface of the insert to engage a second surface of the valve plug tip to urge the shoulder against the inner surface of the lip to provide a compressive force to the valve plug tip along a direction of the axis, wherein the flow control apparatus is part of a rotary valve.

8. A flow control apparatus of claim 7, wherein the insert is composed of a first material and the valve plug tip is composed of a second material different than the first material.

9. A flow control apparatus of claim 8, wherein the first material comprises stainless steel and the second material comprises tungsten carbide.

10. A flow control apparatus of claim 7, wherein the valve plug tip comprises a cylindrical body coupled to the flange.

11. A flow control apparatus of claim 7, wherein the cylindrical housing is composed of stainless steel.

12. A flow control apparatus of claim 7, further comprising a seal weld between the insert and the cylindrical housing to prevent rotation of the insert relative to the cylindrical housing during operation.

13. A flow control apparatus as defined in claim 7, wherein the valve plug tip is interchangeable with another valve plug tip.

14. A flow control apparatus, comprising:
    means for controlling fluid flow through a rotary valve, wherein the means for controlling fluid flow comprises a valve plug tip;
    means for retaining the means for controlling fluid flow; and
    means for transmitting force to the means for controlling fluid flow, the means for transmitting force threadably coupled to the means for retaining and a stem of the rotary valve, wherein the means for transmitting force contacts a portion of the means for controlling fluid flow to cause a first surface of the means for controlling fluid flow to be urged against a second surface of the means for retaining, wherein the first and second surfaces are perpendicular to an axis defined along a length of the means for transmitting force.

15. A flow control apparatus as defined in claim 14, wherein the means for controlling fluid flow is composed of a first material and the means for retaining is composed of a second material different from the first material.

16. A flow control apparatus as defined in claim 14, further comprising means for securing the means for controlling fluid flow, the means for retaining, and the means for transmitting force together via an aperture through the means for controlling fluid flow, the means for retaining, and the means for transmitting force.

17. A flow control member for a valve, comprising:
    a sleeve having first and second ends, the first end including a lip, the lip defining an inner surface;
    an insert disposed in the second end of the sleeve and defining an axis along the length of the insert; and
    a valve plug tip disposed in the sleeve and having a flange defining a shoulder, the shoulder and the inner surface perpendicular to the axis, wherein the insert has a first contact surface to engage a second contact surface of the valve plug tip to urge the shoulder of the valve plug tip against the inner surface of the lip to provide a compressive force to the valve plug tip along a direction of the axis, wherein the valve comprises a rotary valve.

* * * * *

UNITED STATES PATENT AND TRADEMARK OFFICE
CERTIFICATE OF CORRECTION

PATENT NO.        : 9,316,321 B2
APPLICATION NO.   : 13/103736
DATED             : April 19, 2016
INVENTOR(S)       : Michael Wildie McCarty It is certified that error appears in the above-identified patent and that said Letters Patent is hereby corrected as shown below:

In the Claims

Column 9, line 59 (Claim 7): Replace the word "insert" between "the" and "a" with "insert,"

Signed and Sealed this
Fourteenth Day of June, 2016

Michelle K. Lee
*Director of the United States Patent and Trademark Office*